patented Nov. 19, 1963

3,111,485
REGENERATING MIXED BED ION EXCHANGERS IN FLUID DEIONIZING PROCESS
Robert Kunin, Yardley, Pa., assignor to Rohm & Haas Company, Philadelphia, Pa., a corporation of Delaware
No Drawing. Filed Nov. 30, 1960, Ser. No. 72,559
12 Claims. (Cl. 210—32)

This invention concerns a process for deionizing or removing the ions from fluids. More particularly, it concerns a deionization process which employs a mixture of a weakly basic anion exchanger and a weakly acidic cation exchanger for deionizing fluids. Particularly, the process of the present invention makes it possible to regenerate the exchangers without the necessity of separating them prior to regeneration.

Deionization processes employing mixtures of weak base anion exchangers and weakly acidic cation exchangers are well-known in the prior art. Although such mixtures will not effect as complete deionization as will mixtures of strong base anion exchangers and strongly acidic cation exchangers, there are many applications in which complete deionization is not required. One of the very real advantages of a mixed bed of weakly basic anion exchanger and weakly acidic cation exchanger is its very high regeneration efficiency. Both exchangers can be effectively regenerated to high capacity levels employing amounts of regenerants only slightly in excess of those required by theory.

There are available weak base anion exchangers and weakly acidic cation exchangers which exhibit high capacity; thus, it is possible to treat large volumes of fluids between regenerations. Prior art processes employing mixed beds of anion and cation exchangers have required that the exchangers be separated prior to regeneration. This particular step has frequently given rise to difficulties because of an effect known as "clumping." The cation and anion exchange resin particles appear to adhere to one another and separation under these conditions is quite difficult. Furthermore, in order to effect good separation by hydraulic classification, it is essential that there be a difference in density of the two exchangers. Thus, the choice of exchangers which can be used in mixed beds is somewhat limited in prior art processes because of the necessity of being able to separate them. Using the process of the present invention, it is not necessary to separate the exchangers for regeneration, and thus the choice of exchangers which can be used is not limited because of any density differences which are required in the prior art processes.

By the same token, there are also restrictions on the particle sizes of the anion and cation exchangers which can be used in the prior art processes which require separation of the two exchangers prior to regeneration. Since separation is not required in the process of the present invention, there are no practical restrictions on the particle sizes of the exchangers used.

The process of the present invention employs a mixed bed of weak base anion exchangers and weakly acidic cation exchangers for the deionization of fluids, and the deionization step itself is substantially the same as employed in the prior art. When the bed is depleted or exhausted, as determined by the effluent from the bed exceeding a pre-determined ion content, the flow of the fluid to be deionized is stopped, the bed is rinsed with water, and an aqueous solution of a base is passed through the bed. The main effect of the basic solution is the regeneration of the weak base anion exchanger to reconvert it to the free base form. There is, however, a side effect in that any of the carboxyl groups which have not been neutralized with the metallic ions from the fluid being deionized are converted to metal salts. Any remaining base solution or salts in the bed are then removed by rinsing with water. An aqueous solution of carbon dioxide, preferably under pressure, is then passed through the bed, and the cation exchanger is re-converted to the free acid form. While the free base form of the weak base anion exchanger will absorb some carbon dioxide, the capacity for carbon dioxide absorption is very low. Following the passage of the carbon dioxide solution through the bed, the bed is then rinsed with water, thus removing any salts present and releasing any carbon dioxide which had been absorbed by the weak base anion exchanger. The thus-regenerated bed is returned to the deionization cycle.

If the solution being deionized contains any turbidity due to the presence of solid particles, such solid particles will be filtered from the fluid by the bed. Any such filtering action takes place very close to the top of the bed and, generally speaking, the bed will not be grossly contaminated thereby. If such a turbid fluid is being deionized, then it is best to backwash after the end of the deionization step, and this is done by passing water upflow through the bed at such a rate that the turbidity will be washed from the bed at a rate which is not high enough to expand the bed appreciably. This latter limitation is important if there be a substantial difference in density and/or particle size between the cation exchanger and the anion exchanger. Under such conditions, backwashing at too high a rate will cause at least partial separation of the two exchangers by hydraulic classification and may require a re-mixing before reuse in the deionization cycle.

One modification of the process of the present invention employs the ion exchangers as fibers. The so-called "mixed bed" can be prepared by intimately interweaving cation exchange fibers with anion exchange fibers. The use of a construction such as this has the advantage that separation of the two exchangers is virtually impossible since the relationship of the fibers is fixed with respect to each other. Methods of preparing ion exchange fabrics are set forth in U.S. Patent No. 2,933,460, in the hands of a common assignee, and the information therein is incorporated herein by reference.

The preferred classes of weakly acidic cation exchangers used in the process of the present invention are those in which the cation exchange activity is due to the presence of carboxylic acid groups in the molecule. Such resins are well-known and commercially available and the preparation of resins of this type is set forth in detail in U.S. Patent Nos. 2,319,359; 2,333,754; 2,340,110; and 2,340,111. The information therein is incorporated herein by reference. One particularly preferred carboxylic resin is prepared by suspension copolymerizing a mixture of methacrylic acid and divinylbenzene using about 3 to 10% divinylbenzene. This type of resin is commercially available as Amberlite IRC-50. Another preferred carboxylic exchanger is prepared by copolymerizing methyl or ethyl acrylate with divinylbenzene and subsequently hydrolyzing the copolymer to produce carboxylic groups.

Weak base anion exchangers are well-known in the art and one class is represented by resins set forth in U.S. Patent Nos. 2,354,671; 2,356,151; and 2,402,384. They are prepared by the reaction of phenols with formaldehyde and a polyalkyleneamine. Another type of weak base resin is prepared as set forth in U.S. 2,591,574, by reacting a halomethylated cross-linked copolymer with a primary or secondary amine. Still another type is prepared by the aminolysis of acrylate ester polymers with polyamines as set forth in U.S. Patent No. 2,675,359.

Deionization of fluids can be effected by batch methods, but such methods do not represent the preferred processes. More complete deionization and more effective use of the resin and regenerant is obtained by column processes. In such processes, the fluid to be deionized is passed, generally downflow, through a column or bed of the mixed resins. To charge the column with the resins, the resins may be intimately admixed and then charged to the column or they may be charged to the column separately, and mixed in situ. This in situ mixing can be effected by adding water to the column until it is 2 to 4 inches above the top of the bed and vigorously agitating the bed, for instance, by bubbling air through the bed from the bottom to the top until the two resins are intimately admixed.

The ratios of cation exchangers to anion exchangers depend on the relative capacities of the particular resins being used. In general, one equivalent of anion capacity is used per one equivalent of cation capacity and given the capacity values for any resin it becomes immediately apparent what the volume or weight of one equivalent is.

The basic solutions used for the regeneration of the anion exchanger are those commonly employed and are well-known to those skilled in the art. Aqueous solutions of sodium hydroxide, sodium carbonate, or the corresponding lithium or potassium salts can be used. Lower alkyl amines with adequate water solubility can also be used. Typical of such amines are the mono-, di- and tri- methyl- and ethylamines. Particularly if it is desired to recover the regenerants as set forth hereinafter, ammonium hydroxide is particularly preferred.

The concentration of the aqueous ammonium hydroxide solution employed for the regeneration of the weak base anion exchanger is not particularly critical, but, if the concentration is too low, then the time required to pass the ammonium hydroxide solution through the bed is unduly long, and the efficiency of regeneration is reduced. While it is possible to use ammonia solutions of from 0.5 to 28% (as $NH_3$) by weight, the preferred range of concentrations is from 5% to 15% by weight (as $NH_3$).

The concentration of the carbon dioxide in the aqueous solution employed for the regeneration of the cation exchanger is directly proportional to the carbon dioxide pressure applied to the solution. Thus, while it is possible to regenerate using $CO_2$ solutions at atmospheric pressure, the process is much more effective when the $CO_2$ solution is used under $CO_2$ pressure. It is commonly thought that carbon dioxide in aqueous solution is a relatively ineffective regenerant for cation exchangers, but this conclusion has been frequently reached because super-atmospheric pressures were usually not employed. However, although the pH of a carbonic acid solution at room temperature and atmospheric pressure is 4.0, water saturated with carbon dioxide at carbon dioxide pressures in the range of 5 to 10 atmospheres has a pH of approximately 3.3. In this pH range, carboxylic cation exchangers have negligible capacity for monovalent and divalent ions, and thus can be readily regenerated by such a pressurized solution of carbon dioxide.

As set forth hereinbefore, one important advantage when employing weak base anion exchangers and weakly acidic cation exchangers is the very high regeneration efficiencies which are obtainable. Thus, one equivalent of base or acid will remove the ions (or regenerate) one equivalent of depleted anion exchanger or cation exchanger respectively. In practice, it is preferred to use 1.1 equivalents of regenerant per equivalent of depleted exchanger. The volume of $CO_2$ saturated water at 25° C. required per equivalent of depleted cation exchanger is dependent on the pressure above the carbon dioxide solution and shown in the following table.

| Pressure in atmospheres: | Volume of saturated carbon dioxide solution |
|---|---|
| 1 | 26 |
| 2 | 17 |
| 3 | 12 |
| 10 | 4 |

In the process of the present invention, the solution of carbon dioxide can be employed at a pressure of about 3 to about 75 atmospheres, but the preferred range is from 5 to 15 atmospheres. Most of the equipment presently employed for deionization processes is designed to withstand pressures in the preferred range.

The fluids which can be deionized by the process of the present invention are widely divergent in nature, but they must contain sufficient water or some ionizing liquid to effect ionization of the ionizable salts therein. Typical of such fluids are raw water supplies which are used for boiler feed, for chemical processing, or for the preparation of a variety of aqueous solutions, aqueous glycerol, sugar solutions, etc. As set forth hereinbefore, the deionization of fluids employing mixed beds of weak base anion exchanger and weakly acidic cation exchanger is well-known in the art.

One modification of the process of the present invention consists of pre-treating the fluid by passing it through a column of the ammonium form of a strongly acidic cation exchanger. This treatment results in the conversion of the metal ions in the fluid to ammonium ions, and is valuable because the ammonium ions are more readily exchanged by the weakly acidic cation exchanger in the mixed bed. While this step is not required in practicing the process of the present invention, it represents a preferred embodiment. The strongly acidic cation exchanger, upon deletion, is reconverted or regenerated to the ammonium form by the passage therethrough of an ammonium salt. The ammonium salt used for regeneration can be the effluent from the treatment of the mixed bed with ammonium hydroxide, thus conserving chemicals and reducing the costs of operation. The strongly acidic cation exchangers are those containing sulfonic acid groups, and typical of these are the sulfonated coals, sulfonated phenol-formaldehyde resins, and sulfonated vinylpolyvinyl copolymers. Particularly preferred are the resins prepared by the copolymerization of styrene and divinylbenzene and subsequent sulfonation of the resultant copolymer. The prepartion of such resins is set forth in detail in U.S. Patent 2,366,007, and the information therein is incorporated herein by reference.

As set forth hereinbefore, many of the copolymer groups on the cation exchanger are converted to ammonium groups during the passage of the ammonium hydroxide solution through the bed to effect the regeneration of the weakly basic anion exchanger. When the aqueous carbon dioxide solution under pressure is passed through the bed, the ammonium groups on the cation exchanger are displaced and the effluent contains a high proportion of ammonium bicarbonate. This spent regenerant can be passed to waste but, if desirable, it can be treated with calcium oxide and the ammonium hydroxide and calcium carbonate which result can be recovered. The ammonium hydroxide can be re-used to regenerate the weakly basic anion exchanger, and the calcium carbonate can be calcined to produce carbon dioxide and calcium oxide, which can be re-used as set forth hereinbefore.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

A freshly regenerated column containing an intimate admixture of 25 ml. of carboxylic cation exchanger consisting of a copolymer of methacrylic acid (95) with divinylbenzene (5) and 50 ml. of an anion exchanger prepared by the aminolysis of a methyl acrylate (96) with divinylbenzene (4) copolymer with dimethylaminopropylamine was depleted by passing a 0.1 N $NH_4Cl$ solution downwardly through the column. The column was then rinsed with deionized water and the anion exchanger regenerated by passing downwardly through the column a 10% by weight (as NH₃) ammonium hydroxide solution. The column was rinsed with deionized water. Forty-seven hundred ml. of water containing carbon dioxide under 2 atmospheric pressure was then passed downwardly through the bed. This volume of pressurized carbon dioxide solution gave substantially complete regeneration of the cation exchanger.

EXAMPLE II

Using the same process, an aqueous solution of carbon dioxide at 3 atmospheres pressure was used to regenerate the carboxylic exchanger. In this case, 4100 ml. of carbon dioxide gave substantially 100% regeneration.

EXAMPLE III

It is known that different cations are absorbed more or less tenaciously and thus are regenerated at variable efficiencies. Employing the cation exchanger set forth in Example I, the regeneration levels for different ions at different carbon dioxide pressures were determined. The data are set forth in the following table:

| Form of Resin | Carbon Dioxide Pressure | Percent Regeneration |
| --- | --- | --- |
| $NH_4^+$ | 1 atm. | 73 |
| $NH_4^+$ | 3 | 100 |
| $Na^+$ | 3 | 100 |
| $Ca^{++}$ | 3 | 67 |
| $Cu^{++}$ | 3 atm. | 10 |

Thus, it is obvious that pressures greater than 3 atmospheres must be employed for the more tenaciously held ions such as $Ca^{++}$ and $Cu^{++}$.

EXAMPLE IV

A 0.1 N aqueous solution of NaCl was passed through a bed of the $NH_4^+$ form of a sulfonated styrene-divinylbenzene (8.5%) cation exchanger. The effluent from this column was an $NH_4Cl$ solution and was used as the feed in an experiment carried out as set forth in Example I. Substantially the same results were obtained as in Example I.

EXAMPLE V

A regenerated mixed bed as set forth in Example I was depleted with 0.1 N NaCl solution and, after rinsing with deionized water, the anion exchanger was regenerated with a 7% $NH_4OH$ solution. The bed was again rinsed with deionized water and then an aqueous carbon dioxide solution under 3 atmospheres pressure was forced downwardly through the bed. 3300 ml. of the pressurized carbon dioxide solution gave 100% regeneration of the carboxylic cation solution.

EXAMPLE VI

The fibers were based on the acrylonitrile-butoxy ethyl acrylate emulsion-spun fiber cross-linked with methoxy methyl vinyl sulfide. The carboxylic material was prepared by hydrolysis of the above fiber and it had a capacity of approximately 7 milliequivalents per gram. The anion exchange material was prepared by aminolysis of the raw fiber with dimethylaminopropylamine. The anion fiber had a capacity of approximately 3½ milliequivalents per gram.

The deionization was studied by passing a 500 p.p.m. solution of ammonium chloride through a stoichiometric mixture of the two fibers.

A. *Conventional Monobed Column*

20 cc. of the above mixed fiber was packed into a column. Both fiber components had been previously regenerated. 1% sulfuric acid was used for the cation exchanger and 1% ammonium hydroxide was used for the regeneration of the anion exchanger. A 500 p.p.m. solution of ammonium chloride was passed over the column at a flow rate of 1 gallon per cubic foot per minute. Less than 1% leakage was observed until 8 bed volumes of solution had passed through the column. When 9 bed volumes of solution were passed through the column, the leakage was but 10% of the influent. 40% leakage was experienced at 11 bed volumes and 90% leakage was experienced at 13 bed volumes.

B. *Tow Column Operation*

The above experiment was repeated employing an interwoven blend of the anion and cation exchange fibers hanging as a tow. A 4-gram tow of the above blend was hung from a support and the 500 p.p.m. solution was passed through the tow at a flow rate corresponding to 1 gallon per cubic foot per minute. The tow had an approximate volume of 20 cc. Less than 1% leakage was observed for the first seven bed volumes. 10% leakage was observed at 8 bed volumes and 40% leakage was observed at 10 bed volumes.

C. *In Situ Regeneration of a Mixed Bed Ion Excange Fiber Column*

The exhausted column of Example A was regenerated with ammonia and $CO_2$ as described in previous examples and exhausted as in Example A. The leakage characteristics of this second run were identical to those experienced in the first run.

D. *A Moving Mixed Bed Belt*

Four grams of a mixed fiber blend corresponding to the anion exchange and cation exchange fibers described above were woven into a belt and arranged about a series of rollers so that a portion of the belt was always in contact with a solution contained in a trough. 150 cc. of a 500 p.p.m. solution of ammonium chloride was placed in the trough and the belt circulated at a rate corresponding to one complete pass every ten minutes. After 90 minutes, an analysis of the solution in the trough indicated that more than 90% of the ammonium chloride had been removed by the belt.

This application is a continuation-in-part of Serial No. 62,320, expressly abandoned February 10, 1961.

I claim:

1. In a process for the deionization of fluids which comprises passage of the fluids through a mixed bed comprising an intimate admixture of (*a*) a weak base anion exchanger in the free base form and (*b*) a carboxylic cation exchanger in the free acid form until the ion content of the effluent from the bed exceeds a pre-determined value, the improvement which comprises regenerating the intimately admixed bed without the separation of the weak base anion exchanger from the carboxylic cation exchanger by (1) rinsing with water to remove any remaining fluid, (2) passing an aqueous solution of a base through the bed to regenerate the weak base anion exchanger to the free base form, (3) rinsing from the bed the salts formed by the regeneration of the anion exchanger, (4) passing a solution of carbon dioxide in water through the bed to regenerate the cation exchanger, (5) rinsing the bed with water to remove carbon dioxide absorbed by the anion exchanger, and (6) passing the fluid to be deionized through the regenerated bed.

2. A process as set forth in claim 1 in which the fluids, the rinses, the aqueous solution of base, and the aqueous solution of carbon dioxide are passed through the bed downflow.

3. A process as set forth in claim 1 in which the aqueous solution of carbon dioxide is under a carbon dioxide pressure of 3 to 75 atmospheres.

4. A process as set forth in claim 1 in which the aqueous solution of carbon dioxide is under a carbon dioxide pressure of 5 to 15 atmospheres.

5. A process as set forth in claim 1 in which the base for the regeneration of the weak base anion exchanger is selected from the group consisting of sodium, lithium and potassium hydroxides, and carbonates, ammonium hydroxide and mono-, di- and tri-methyl- and ethylamines.

6. A process as set forth in claim 1 in which the base for the regeneration of the weak base anion exchanger is ammonium hydroxide.

7. A process as set forth in claim 6 in which the concentration of the aqueous ammonium hydroxide solution is 0.5% to 28% by weight (as $NH_3$).

8. A process as set forth in claim 6 in which the concentration of the aqueous ammonium hydroxide solution is 5% to 15% by weight (as $NH_3$).

9. A process as set forth in claim 1 in which the fluid to be deionized is passed through a bed of a sulfonic acid type cation exchanger in the ammonium form before passage through the mixed bed.

10. A process as set forth in claim 1 in which the carboxylic cation exchanger is a copolymer of methacrylic acid and divinylbenzene.

11. A process as set forth in claim 1 in which the weak base anion exchanger is selected from the group consisting of copolymers of methyl acrylates and divinylbenzene which have been aminolyzed with a polyamine.

12. A process as set forth in claim 1 in which the weak base anion exchanger and the carboxylic cation exchanger are fibers.

References Cited in the file of this patent

UNITED STATES PATENTS

| | | |
|---|---|---|
| 2,227,520 | Tiger | Jan. 7, 1941 |
| 2,515,581 | Appelquest | July 18, 1950 |
| 2,541,005 | Oldham et al. | Feb. 6, 1951 |
| 2,649,390 | Winters et al. | Aug. 18, 1953 |
| 2,855,363 | Kittredge | Oct. 7, 1958 |
| 2,933,460 | Richter et al. | Apr. 19, 1960 |
| 2,974,101 | Richter | Mar. 7, 1961 |

FOREIGN PATENTS

| | | |
|---|---|---|
| 569,661 | Great Britain | June 24, 1945 |

OTHER REFERENCES

Synthetic Ion-Exchangers by G. H. Osborn, copyrighted Dec. 19, 1955, Chapman & Hall Ltd., 37 Essex St., W.C. 2, London.